(12) United States Patent
Godoy-Lopez et al.

(10) Patent No.: US 10,392,460 B2
(45) Date of Patent: Aug. 27, 2019

(54) PROCESS FOR PRODUCING GRAFT COPOLYMERS ON POLYOLEFIN BACKBONE

(71) Applicant: BOREALIS AG, VIenna (AT)

(72) Inventors: Ricardo Godoy-Lopez, Linz (AT); Floran Prades, Linz (AT); Anh Tuan Tran, Linz (AT)

(73) Assignee: BOREALIS AG, Vienna (AT)

( * ) Notice: Subject to any disclaimer, the term of this patent is extended or adjusted under 35 U.S.C. 154(b) by 23 days.

(21) Appl. No.: 15/510,624

(22) PCT Filed: Sep. 11, 2015

(86) PCT No.: PCT/EP2015/070801
§ 371 (c)(1),
(2) Date: Mar. 10, 2017

(87) PCT Pub. No.: WO2016/038177
PCT Pub. Date: Mar. 17, 2016

(65) Prior Publication Data
US 2017/0260312 A1 Sep. 14, 2017

(30) Foreign Application Priority Data
Sep. 12, 2014 (EP) .................................... 14184518

(51) Int. Cl.
*C08F 255/02* (2006.01)

(52) U.S. Cl.
CPC ........ *C08F 255/02* (2013.01); *C08F 2800/20* (2013.01)

(58) Field of Classification Search
CPC .......................... C08F 255/02; C08F 2800/20
See application file for complete search history.

(56) References Cited

U.S. PATENT DOCUMENTS

| | | |
|---|---|---|
| 3,324,093 A | 6/1967 | Alleman |
| 3,405,109 A | 10/1968 | Rohlfing |
| 3,949,019 A | 4/1976 | Zeitler et al. |
| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,506,056 A | 3/1985 | Gaylord |
| 4,522,930 A | 6/1985 | Albizzati et al. |
| 4,530,912 A | 7/1985 | Pullukat et al. |
| 4,532,313 A | 7/1985 | Matlack |
| 4,543,399 A | 9/1985 | Jenkins, III et al. |
| 4,560,671 A | 12/1985 | Gross et al. |
| 4,581,342 A | 4/1986 | Johnson et al. |
| 4,582,816 A | 4/1986 | Miro |
| 4,657,882 A | 4/1987 | Karayannis et al. |
| 5,391,654 A | 2/1995 | Ahvenainen et al. |
| 5,539,067 A | 7/1996 | Parodi et al. |
| 5,618,771 A | 4/1997 | Parodi et al. |
| 5,945,492 A * | 8/1999 | Robert ................... C08F 255/02 525/285 |
| 6,221,967 B1 | 4/2001 | Rodriguez et al. |
| 6,521,710 B1 * | 2/2003 | Roth ...................... C08F 255/00 525/259 |
| 6,746,738 B1 | 6/2004 | Le Roy et al. |
| 7,312,280 B2 | 12/2007 | Kondo et al. |
| 7,619,050 B2 | 11/2009 | Nesvadba et al. |
| 2006/0142511 A1* | 6/2006 | Couturier ............... C07F 9/4006 526/217 |
| 2006/0160956 A1 | 7/2006 | Ashiura et al. |
| 2011/0046407 A1 | 2/2011 | Couturier |

FOREIGN PATENT DOCUMENTS

| | | |
|---|---|---|
| EP | 0045975 A2 | 2/1982 |
| EP | 0045976 A2 | 2/1982 |
| EP | 0045977 A2 | 2/1982 |
| EP | 0260130 A1 | 3/1988 |
| EP | 0423101 A2 | 4/1991 |
| EP | 0479186 A2 | 4/1992 |
| EP | 0537130 A1 | 4/1993 |
| EP | 0688794 A1 | 12/1995 |
| EP | 0699213 A1 | 3/1996 |
| EP | 0810235 A2 | 12/1997 |

(Continued)

OTHER PUBLICATIONS

Yang, J. et al. Journal of Applied Polymer Science vol. 79 pp. 535-543 (Nov. 2000).*
International Search Report and Written Opinion for International Application No. PCT/EP2015/070801 dated Nov. 13, 2015.
He, "Unexpected proton spin-lattice relaxation in the solutions of polyolefin and tetrachloroethane", Magnetic Resonance in Chemistry, vol. 48, 2010, pp. 537-542.
Godoy Lopez et al., "Synthesis and Characterization of Macroalkoxyamines Based on Polyethylene", Macromolecules, 2004, No. 37, pp. 3540-3542.
Godoy Lopez et al., "Catalyzed Chain Growth of Polyethylene on Magnesium for the Synthesis of Macroalkoxyamines: Application to the Production of Block Copolymers Using Controlled Radical Polymerization" Journal of Polymer Science: Part A: Polymer Chemistry, vol. 45, 2007, pp. 2705-2718.

(Continued)

*Primary Examiner* — Irina S Zemel
*Assistant Examiner* — Jeffrey S Lenihan
(74) *Attorney, Agent, or Firm* — Roberts Mlotkowski Safran Cole & Calderon, P.C.

(57) ABSTRACT

The present invention provides a process of producing a modified polymer composition, which composition comprises a free-radical polymeriseable monomer grafted to a polyolefin backbone. The process comprises contacting, in an extruder, an olefin polymer and the free-radical polymeriseable monomer in the presence of a stable radical in an extruder and extruding the composition.

12 Claims, No Drawings

(56) References Cited

FOREIGN PATENT DOCUMENTS

| | | | |
|---|---|---|---|
| EP | 0837080 | A1 | 4/1998 |
| EP | 1538167 | A1 | 6/2005 |
| EP | 0696293 | B2 | 6/2009 |
| EP | 2532687 | A2 | 12/2012 |
| EP | 2610271 | A1 | 7/2013 |
| WO | 8707620 | A1 | 12/1987 |
| WO | 9212182 | A1 | 7/1992 |
| WO | 9219653 | A1 | 11/1992 |
| WO | 9219658 | A1 | 11/1992 |
| WO | 9219659 | A1 | 11/1992 |
| WO | 9221705 | A1 | 12/1992 |
| WO | 9311165 | A1 | 6/1993 |
| WO | 9311166 | A1 | 6/1993 |
| WO | 9319100 | A1 | 9/1993 |
| WO | 9425495 | A1 | 11/1994 |
| WO | 9532994 | A1 | 12/1995 |
| WO | 9618662 | A1 | 6/1996 |
| WO | 9710248 | A1 | 3/1997 |
| WO | 9728170 | A1 | 8/1997 |
| WO | 9736939 | A1 | 10/1997 |
| WO | 9736942 | A1 | 10/1997 |
| WO | 9747682 | A1 | 12/1997 |
| WO | 9807758 | A1 | 2/1998 |
| WO | 9812234 | A1 | 3/1998 |
| WO | 9840331 | A1 | 9/1998 |
| WO | 9846616 | A1 | 10/1998 |
| WO | 9849208 | A1 | 11/1998 |
| WO | 9856831 | A1 | 12/1998 |
| WO | 9910353 | A1 | 3/1999 |
| WO | 9912981 | A1 | 3/1999 |
| WO | 9919335 | A1 | 4/1999 |
| WO | 9932525 | A1 | 7/1999 |
| WO | 9933842 | A1 | 7/1999 |
| WO | 9941290 | A1 | 8/1999 |
| WO | 9945041 | A1 | 9/1999 |
| WO | 9951646 | A1 | 10/1999 |
| WO | 0014135 | A1 | 3/2000 |
| WO | 0029452 | A1 | 5/2000 |
| WO | 0034341 | A2 | 6/2000 |
| WO | 0148034 | A2 | 7/2001 |
| WO | 0155230 | A1 | 8/2001 |
| WO | 0170395 | A2 | 9/2001 |
| WO | 0192397 | A1 | 12/2001 |
| WO | 0202576 | A1 | 1/2002 |
| WO | 0228946 | A1 | 4/2002 |
| WO | 03000754 | A1 | 1/2003 |
| WO | 03000755 | A2 | 1/2003 |
| WO | 03000756 | A1 | 1/2003 |
| WO | 03000757 | A1 | 1/2003 |
| WO | 03106510 | A1 | 12/2003 |
| WO | 2004029112 | A1 | 4/2004 |
| WO | 2005066280 | A2 | 7/2005 |
| WO | 2005105863 | A2 | 11/2005 |
| WO | 2005113622 | A1 | 12/2005 |
| WO | 2005118655 | A1 | 12/2005 |
| WO | 2006097497 | A1 | 9/2006 |
| WO | 2007025640 | A1 | 3/2007 |
| WO | 2007107448 | A1 | 9/2007 |
| WO | 2007116034 | A1 | 10/2007 |
| WO | 2009027075 | A2 | 3/2009 |
| WO | 2009054832 | A1 | 4/2009 |
| WO | 2009149001 | A1 | 12/2009 |
| WO | 2012001052 | A2 | 1/2012 |
| WO | 2012007430 | A1 | 1/2012 |

OTHER PUBLICATIONS

Premphet et al., "Melt Grafting of Maleic Anhydride Onto Elastomeric Ethylene-Octene Copolymer by Reactive Extrusion", Polymer Engineering and Science, vol. 41, No. 11, Nov. 2001, pp. 1978-1986.
Britovsek, et al., "The Search for New-Generation Olefin Polymerization Catalysts: Life beyond Metallocenes", Angewandte Chemie International Edition, vol. 38, 1999, pp. 428-447.
Busico et al., H NMR Analysis of Chain Unsaturations in Ethene/1-Octene Copolymers Prepared with Metallocene Catalysts at High Temperature, Macromolecules, vol. 38, 2005, pp. 6988-6996.

* cited by examiner

PROCESS FOR PRODUCING GRAFT COPOLYMERS ON POLYOLEFIN BACKBONE

FIELD OF THE INVENTION

The present invention is directed to a process for producing graft copolymers. More specifically, the present invention is directed to grafting free-radical polymerisable comonomers into a polyolefin backbone in an extrusion process.

PROBLEM TO BE SOLVED

It is known to incorporate functional comonomers, such as organic acids and acid anhydrides, into polyolefin backbone in an extruder by using peroxides as free radical initiators. Such process is disclosed, among others, in U.S. Pat. No. 3,949,019. Such processes have the disadvantage that the peroxide also initiates secondary reactions, such as crosslinking of the polymer. This has the effect that the melt flow rate of the polymer changes during the grafting process. Further, a gel having extremely high molecular weight may be formed, which has a negative effect on the final product properties and may also have an adverse effect on the grafting process.

It is also known to use alkoxyamines as scorch retardants which prevent premature cross-linking of the polymer. Such use has been proposed, among others, in WO-A-2009149001 and WO-A-2002028946. The documents do not discuss grafting free-radical polymerisable comonomers into the polyolefin backbone.

WO-A-2001092397 discloses a process for molecular weight increasing or crosslinking of non-halogen-containing thermoplastic polymers involving mixing and heating a composition above the melting point of the polymer in the case of crystalline polymers or the softening point in the case of amorphous polymers. The composition comprises a non-halogen-containing thermoplastic polymer, a functional compound having at least two unsaturated carbon bonds, and an alkoxyamine having a structural unit, which forms free radicals at the melting temperature/processing temperature of the polymer. In this specific case the alkoxyamine is mixed with the other reactants before the reaction.

WO-A-2005066280 discloses a free-radical crosslinkable polymeric composition which comprises a free-radical crosslinkable polymer blend susceptible to premature cross-linking at the blend's nominal melt processing temperature; a crosslinking-temperature-profile modifier; and optionally a free-radical inducing species and a blowing agent selected from chemical and physical blowing agent. In this composition the crosslinking-temperature-profile modifier can be a stable organic free radical like TEMPO.

Functionalization of polyethylene chains involving alkoxyamine compounds have been found in the bibliography. However, the functionalization is carried out in a solution process followed by a second step for block copolymers synthesis and not directly in extruder process. Such processes have been disclosed in Lopez, R. G.; Boisson, C.; D'Agosto, F.; Spitz, R.; Boisson, F.; Bertin, D.; Tordo, P. Macromolecules 2004, 37, 3540-3542; and Ricardo Godoy Lopez, Christophe Boisson, Franck D'Agosto, Roger Spitz, Journal of Polymer Science Part A: Polymer Chemistry, Volume 45, Issue 13, pages 2705-2718, 2007. Such solution process involves additional process stages which make it economically unattractive.

U.S. Pat. No. 4,506,056 discloses a process for grafting maleic anhydride to polymer with decreased crosslinking or degradation by contacting a polymer, maleic anhydride, a free-radical generator and an additive. Suitable additives were, for instance, compounds containing nitrogen, phosphorous or sulphur atoms, such as dimethyl formamide, N,N-dimethyl aniline and triphenyl phosphite.

The work in U.S. Pat. No. 4,506,056 was also referred to in the article of Premphet and Chalearmthitipa in Polymer Engineering and Science, November 2001, vol. 41, No. 11, pages 1978-1986.

The present invention aims to overcome the problems of the prior art processes and provide an economically feasible process for producing graft copolymers where a free radical polymeriseable comonomer is grafted into a polyolefin backbone and in which process the secondary reactions, such as crosslinking, are minimized or eliminated.

SUMMARY OF THE INVENTION

As seen from one aspect the present invention provides a process of producing a modified olefin polymer (X) comprising a free-radical polymeriseable monomer grafted to a polyolefin backbone in an extruder, which process comprises: contacting, in an extruder, an olefin polymer (A) and the free-radical polymeriseable monomer (D) and optionally a free-radical generator (C) to produce a mixture; extruding the mixture in the extruder in the presence of a stable radical (B) having a nitrogen-oxygen bond and which is formed by a cleavage of an alkoxyamine (F) thereby graft copolymerising the free-radical polymerisable monomer (D) to the olefin polymer (A) to produce the modified polymer composition (X); recovering the modified olefin polymer (X) from the extruder; and cooling the modified olefin polymer (X).

DETAILED DESCRIPTION

Olefin polymer (A)

The olefin polymer (A) used in the present invention may be any homo- or copolymer consisting predominantly of olefin-derived units. Such polymers are, for instance, homopolymers of ethylene, copolymers of ethylene with one or more α-olefins having from 3 to 12 carbon atoms and optionally dienes, copolymers of ethylene with acrylates and methacrylates, copolymers of ethylene with a diene, copolymers of ethylene with a vinylsilane, homopolymers of propylene, copolymers of propylene with ethylene, copolymers of propylene with one or more α-olefins having from 4 to 12 carbon atoms, optionally together with ethylene, homopolymers of 1-butene, copolymers of 1-butene with one or more of ethylene, propylene and α-olefins having from 5 to 12 carbon atoms, homopolymers of 4-methyl-1-pentene and copolymers of 4-methyl-1-pentene with one or more of ethylene, propylene, 1-butene and α-olefins having from 8 to 12 carbon atoms.

According to an especially preferred embodiment the olefin polymer (A) is an ethylene polymer which predominantly comprises units derived from ethylene. The ethylene polymer preferably has a melt flow rate $MFR_2$ measured at 190 ° C. and under a load of 2.16 kg of 0.3 to 100 g/10 min, more preferably from 0.5 to 20 g/10 min and still more preferably from 0.5 to 10 g/10 min. Furthermore, it preferably has a density of from 850 to 980 kg/m$^3$, more preferably from 855 to 960 kg/m$^3$ and in particular from 857 to 955 kg/m$^3$. Thus, for example, an adhesive resin used in pipe coating applications preferably has a density of from 900 to 950 kg/m³, more preferably from 925 to 945 kg/m3 and even more preferably from 930 to 942 kg/m³.

It is preferred that the ethylene polymer has unsaturations in the polymer chain. Thus, the ethylene polymer preferably contains at least 0.3 unsaturations per 1000 carbon atoms. More preferably the ethylene polymer contains at least 0.4 unsaturations per 1000 carbon atoms. In particular the ethylene polymer contains at least 0.46 unsaturations per 1000 carbon atoms. Especially preferably the unsaturations as described above are vinyl groups.

According to one preferred embodiment the ethylene polymer has been produced by homopolymerising ethylene or copolymerising ethylene with one or more α-olefins having from 3 to 12 carbon atoms and optionally dienes in the presence of a polymerisation catalyst. The polymerisation catalyst typically comprises a transition metal compound and an activator.

Suitable polymerisation catalysts known in the art include Ziegler-Natta catalysts, metallocene catalysts, chromium catalysts and non-metallocene catalysts such as late transition metal catalysts. Suitable activators include metal alkyls, such as aluminium alkyls, alumoxanes, such as methylaluminumoxane and organoboron compounds, such as boron compounds having fluorinated aromatic ligands.

Examples of suitable Ziegler-Natta catalysts and compounds in catalysts are shown in among others, in WO-A-87/07620, WO-A-92/21705, WO-A-93/11165, WO-A-93/11166, WO-A-93/19100, WO-A-97/36939, WO-A-98/12234, WO-A-99/33842, WO-A-03/000756, WO-A-03/000757, WO-A-03/000754, WO-A-03/000755, WO-A-2004/029112, EP-A-2610271, WO-A-2012/007430. WO-A-92/19659, WO-A-92/19653, WO-A-92/19658, U.S. Pat. Nos. 4,382,019, 4,435,550, 4,465,782, 4,473,660, 4,560, 671, 5,539,067, 5,618,771, EP-A-45975, EP-A-45976, EP-A-45977, WO-A-95/32994, U.S. Pat. Nos. 4,107,414, 4,186, 107, 4,226,963, 4,347,160, 4,472,524, 4,522,930, 4,530,912, 4,532,313, 4,657,882, 4,581,342, 4,657,882, EP-A-688794, WO-A-99/51646, WO-A-01/55230, WO-A-2005/118655, EP-A-810235 and WO-A-2003/106510.

Metallocenes comprise an organic ligand having a cyclopentadienyl skeleton. They are described, for instance, in EP-A-260130, WO-A-97/28170, WO-A-98/46616, WO-A-98/49208, WO-A-98/040331, WO-A-99/12981, WO-A-99/19335, WO-A-98/56831, WO-A-00/34341, WO-A-01/148034, EP-A-423101, EP-A-537130, WO-A-2002/02576, WO-A-2005/105863, WO-A-2006097497, WO-A-2007/116034, WO-A-2007/107448, WO-A-2009/027075, WO-A-2009/054832, WO-A-2012/001052, and EP-A-2532687.

The term "non-metallocene" used herein means compounds, which bear no cyclopentadienyl ligands or fused derivatives thereof, but one or more non-cyclopentadienyl η-, or σ-, mono-, bi- or multidentate ligand. Such ligands can be chosen e.g. from the groups (b) and (c) as defined above and described e.g. in WO 01/70395, WO 97/10248, WO 99/41290, and WO 99/10353 and further in V. C. Gibson et al., in Angew. Chem. Int. Ed., engl., vol 38, 1999, pp 428 447.

The processes for homopolymerising ethylene or copolymerising ethylene with one or more α-olefins having from 3 to 12 carbon atoms and optionally dienes in the presence of a polymerisation catalyst may be conducted in slurry, in gas phase, in solution or in combinations thereof. Examples of such processes can be found in WO-A-92/12182, WO-A-96/18662, WO-A-2007/025640, U.S. Pat. No. 4,543,399, EP-A-699213, WO-A-94/25495, EP-A-696293, WO-A-00/29452, U.S. Pat. Nos. 4,582,816, 3,405,109, 3,324,093, EP-A-479186, U.S. Pat. No. 5,391,654, WO-A-2005113622, WO-A-99/45041, WO-99/32525 and WO-97/36942.

According to an alternative preferred embodiment the ethylene polymer has been produced by homopolymerising ethylene or copolymerising ethylene with one or more comonomers selected from the group of acrylates, methacrylates, dienes and vinylsilanes at a high pressure and temperature where the polymerisation is initiated with a free-radical generator. The temperature is typically within the range of from 125 to 350° C. and the pressure within the range of from 150 to 350 MPa. Suitable free-radical generators to initiate the polymerisation process are, for instance, organic peroxides, oxygen or combinations thereof.

According to another preferred embodiment the olefin polymer is a propylene polymer. The propylene polymer preferably has a melt flow rate $MFR_2$ measured at 230° C. and under a load of 2.16 kg of 0.3 to 100 g/10 min, more preferably from 0.5 to 50 g/10 min and still more preferably from 0.5 to 20 g/10 min.

The propylene polymer has been produced by homopolymerising propylene or copolymerising propylene with one or more comonomers selected from ethylene and α-olefins having from 4 to 12 carbon atoms and dienes in the presence of a polymerisation catalyst. The polymerisation catalyst typically comprises a transition metal compound and an activator.

Suitable polymerisation catalysts known in the art include Ziegler-Natta catalysts and metallocene catalysts. Suitable activators include metal alkyls, such as aluminium alkyls, alumoxanes, such as methylaluminumoxane and organoboron compounds, such as boron compounds having fluorinated aromatic ligands. The activator may further include an electron donor compound for controlling the stereospecifity of the catalyst. Examples of suitable electron donors are shown in WO-A-95/32994, U.S. Pat. Nos. 4,107,414, 4,186, 107, 4,226,963, 4,347,160, 4,382,019, 4435550, 4,465,782, 4,472,524, 4,473,660, 4,522,930, 4,530,912, 4,532,313, 4,560,671, 4,657,882 4,472,524, 4,522,930, 4,560,671, 4,581,342, 4,657,882, EP-A-45976, EP-A-45977 and EP-A-1538167.

The processes for homopolymerising propylene or copolymerising propylene with one or more comonomers selected from ethylene and α-olefins having from 4 to 12 carbon atoms and dienes in the presence of a polymerisation catalyst may be conducted in slurry, in gas phase or in a combination thereof.

Stable Radical (B)

The stable radical (B) according to the present invention has a nitroxy group. It may be formed through a decomposition of an alkoxyamine (F) into an alkyl radical and a nitroxide stable radical (B). The alkyl radical may react with free-radical polymerisable unsubstituted monomers (D), polyolefin chain or both. Further, the alkyl radical may further react with the nitroxide stable radical (B) thus forming again an alkoxyamine (F). Alternatively, the stable radical (B) may be introduced directly into the extruder.

According to one preferred embodiment of the invention the stable radical (B) is added into the extruder together with the olefin polymer (A) and optionally the free-radical generator (C). The stable radical (B) is then preferably a piperidinyloxy derivative (E). Examples of suitable piperidinyloxy derivatives are 2,2,4,4-tetramethylpiperidinyloxy (TEMPO); ((2',2',6',6'-tetramethyl-1'-piperidinyloxy) methyl)benzene; 1-phenyl-1-(2',2',6',6'-tetramethyl-1'-piperidinyloxy)ethane; 1-(4'-bromophenyl)-1-(2",2",6",6"-tetramethyl-1"-piperidinyloxy)ethane; 1-phenyl-1-(2',2',6',6'-tetramethyl-1'-piperidinyloxy)propane and 1-(benzyloxy)-2-phenyl-2-(2',2',6',6'-tetramethyl-1'-piperidinyloxy)ethane. The use of such compounds has been disclosed, among others, in WO-A-2009/149001 and WO-A-2002/028946 where their use as scorch retarders was disclosed; and WO-A-2005/066280 where their use as crosslinking-temperature-profile modifiers was disclosed.

According to an alternative embodiment the stable radical (B) is formed by decomposition of an alkoxyamine (F). The alkoxyamine (F) is then added into the extruder together with the olefin polymer (A) and the optional free-radical generator (C).

Alkoxyamine (F)

The alkoxyamine (F) is a molecule comprising an N-O group and which can undergo thermal cleavage thereby producing the stable radical (B). It can be a macromolecule, such as a piperidinyloxy grafted olefin polymer (G). Alternatively, the alkoxyamine (F) may also be a molecule having a structure according to Formula (I).

According to one preferred embodiment the alkoxyamine (F) is produced by grafting the piperidinyloxy derivative (E) as described above to the olefin polymer (A). The piperidinyloxy derivative (E) may be grafted to the olefin polymer (A) according to any method known in the art. Typically the piperidinyloxy derivative (E) is mixed with polymer, optionally together with a free-radical generator (C) as described below. The mixture is then introduced into an extruder where the piperidinyloxy derivative (E) is grafted to the polymer at a high temperature. The temperature is preferably higher than the melting temperature of the olefin polymer. On the other hand, the temperature is preferably lower than the decomposition temperature of the olefin polymer (A) and/or the stable radical (B). Typically the temperature of the melt is not less than 120° C., preferably not less than 125° C. and more preferably not less than 130° C. Further, the temperature is typically not greater than 250° C., preferably not greater than 220° C. and more preferably not greater than 210° C. Further, the residence time in the extruder should be sufficient to ensure the completion of the grafting reaction. As the residence time depends on the temperature no exact limit can be given. However, it is preferred to introduce the piperidinyloxy derivative (E) into the feed port of the extruder so that the whole length of the screw is available for the grafting reaction. Further, if needed it is possible to adjust the throughput for ensuring a sufficient residence time. The resulting piperidinyloxy derivative grafted olefin polymer (G) may then be recovered and stored for later use or may be used directly as raw material in a subsequent extrusion step. Especially it is preferred to conduct the grafting of the free-radical polymerisable monomer (D) in an extrusion step following the step of grafting the piperidinyloxy derivative (E) to the olefin polymer (A). In such a process the melt comprising the piperidinyloxy derivative grafted olefin polymer (G) and unreacted olefin polymer (A) is passed to a subsequent extruder where the free-radical polymerisable monomer (D) and optionally the free-radical generator (C) are added.

According to another preferred embodiment a commercially available alkoxyamine (F) is used. Examples of such commercially available alkoxyamines (F) are those represented by Formula (I) below.

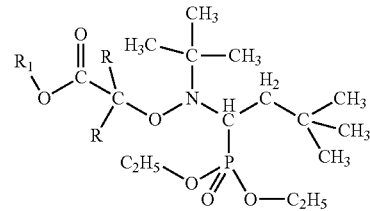

(Formula I)

In Formula (I) above R represents a linear or branched alkyl having from 1 to 3 carbon atoms and $R_1$ represents a hydrogen atom, an alkali metal such as Li, Na or K, or $NH_4^+$, $Bu_4N^+$ or $Bu_3NH^+$. Such alkoxyamines are disclosed in U.S. Pat. Nos. 2006/0142511 and 2011/0046407 where their use as initiators for free-radical polymerisation was disclosed; U.S. Pat. No. 7,619,050 where their use as a regulator together with peroxide initiators in acrylate polymerisation was disclosed; and WO-A-2001/092397 where their use as an initiator in crosslinking of polymers was disclosed. An especially preferred alkoxyamine compound is 2-methyl-2-[N-(tert-butyl)-N-(diethoxyphosphoryl-2,2,-dimethylpropyl)aminoxy]propionic acid (available under the trade name Block Builder, CAS No. 654636-62-1).

The stable radical (B) comprising the nitroxide group is formed from the alkoxyamine (F) through thermal cleavage. Simultaneously an alkyl radical is formed. The alkyl radical then undergoes further reaction, such as polymerisation with the free-radical polymerisable monomer (D) or initiation of a polymeric radical. Formula II below shows the mechanism.

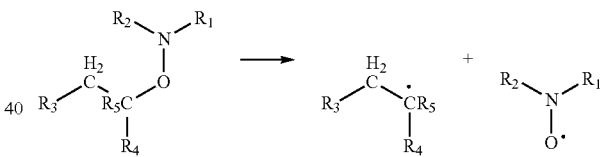

(Formula II)

In Formula (II) above each of $R_1$, $R_2$, $R_3$, $R_4$ and $R_5$ may be an alkyl group, optionally including heteroatoms. Further, $R_3$ can be a polymer chain and each of $R_3$, $R_4$ and $R_5$ can be hydrogen.

The stable radical (B) is preferably present in such an amount that the ratio of the nitroxy groups in the stable radical (B) expressed in moles to the weight of the olefin polymer (A) is from 0.005 to 1.0 mol/kg, preferably from 0.01 to 0.8 mol/kg.

Free-radical Generator (C)

The free-radical generator (C) optionally used in the process of the present invention may be any free-radical generator known in the art. Examples of suitable groups of compounds are organic peroxides, inorganic peroxides, hydroperoxides and azo compounds. Suitable free-radical initiators are disclosed, among others, in U.S. Pat. Nos. 6,746,738, 7,312,280 and WO-A- 1997/047682, disclosing the use of peroxides in grafting or crosslinking; and U.S. Pat. No. 6221967 B1 disclosing the use of aminocarboxylic acids as comonomers in graft copolymerisation. However, the stable radical containing the nitroxy group (B), such as the piperidinyloxy derivatives (E) discussed earlier should not be understood as the free-radical generator (C) in the context of the present invention.

Examples of suitable peroxides which can be used in the present invention are organic peroxides and inorganic peroxides.

Suitable organic peroxides which may be used in the process of the present invention include acyl peroxides, dialkylperoxydicarbonates, (tert-alkyl)peroxyesters, (tert-alkyl, alkyl)mono-peroxycarbonates, di(tert-alkyl)peroxyketals, di(tert-alkyl)peroxides, (tert-alkyl) hydroperoxides and ketone peroxides. The free-radical generator may also be a mixture of two or more such compounds.

Examples of acyl peroxides are benzoyl peroxide, 4-chlorobenzoyl peroxide, 3-methoxybenzoyl peroxide and/or methyl benzoyl peroxide.

Examples of alkyl peroxides are allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylarminomethyl-t-butyl peroxide, dimethylaminomethyl-t-butyl peroxide, 1,1-di-(t-amylperoxy)cyclohexane, t-amyl peroxide, t-butylcumyl peroxide, dicumyl peroxide, t-butyl peroxide and/or 1-hydroxybutyl n-butyl peroxide.

Examples of peroxyesters and carbonates are butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1) heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succinimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate.

Also inorganic peroxides, such as potassium persulfate, sodium persulfate or ammonium persulfate may be used.

Examples of suitable azo compounds are azobisisobutyronitrile, 2,2-azobis(2,4,4-trismethylvaleronitrile) and 2,2-azobis(2-cyclopropylpropionitrile).

The amount of the free-radical generator (C), if used, depends on the type and reactivity of the free-radical generator. For some peroxides good results have been obtained when the ratio of the moles of the peroxide to the weight of the olefin polymer (A) is from 0 to 0.030 mol/kg, such as from 0 to 0.02 mol/kg. Depending on the conditions in the extrusion step it is possible not to use the free-radical generator (C) in the process of the present invention. Especially when an alkoxyamine (F) is used for generating the stable radical (B) the process can be conducted in the absence of the free-radical generator (C).

Free-radical Polymerisable Monomer (D)

The free-radical polymerisable monomer (D) may be any monomer which may be radically polymerised into the polyolef in backbone. Examples of such monomers are unsaturated hydrolysable silane compounds, carboxylic acids, and their derivatives, polyenes, such as dienes and trienes, amino compounds and mixtures thereof.

The unsaturated hydrolysable silane compound contains a silicon-bonded hydrolysable group, such as an alkoxy group, a halogen group or an acryloxy group. They further contain a silicon-bonded vinyl-polymerisable group such as a vinyl group or an ethynyl group. The group may be directly bonded to silicon but it may also bind to silicon via a bridge, such as an alkyl bridge having from 1 to 10 carbon atoms.

Examples of suitable silane compounds are vinyltrimethoxysilane, vinyltriethoxysilane, diphenylvinylethoxysilane, diphenylvinylchlorosilane, 5-hexenyltriethoxysilane, 5-hexenyldimethylchlorosilane, 3-methacryloxypropyldimethoxysilane, 7-octenyltrimethoxysilane, styrylethyldiethoxysilane, vinyltris-(β-methoxyethoxy)silane, and 3-methacryloxypropyl trimethoxysilane.

Examples of suitable carboxylic acids and their derivatives are carboxylic acids having from 3 to 10 carbon atoms with preferably at least one olefinic unsaturation and their anhydrides. They include acrylic acid and methacrylic acid and their anhydrides; maleic acid, fumaric acid, itaconic acid, citraconic acid, nadic acid and allyl succinic acid and their anhydrides.

The amount of the free-radical polymerisable monomer (D) depends on the desired properties of the modified olefin polymer (X), the reactivity of the monomer (D) and the reaction conditions. Good results have been obtained when the ratio of the moles of the free-radical polymerisable monomer (D) to the weight of the olefin polymer (A) is from 0.05 to 5 mol/kg, for instance 0.05 to 1 mol/kg.

Extrusion

The extrusion is preferably conducted in two stages. In the first extrusion stage the stable radical (B) is grafted to the olefin polymer (A) for producing the piperidinyloxy derivative grafted olefin polymer (G). The conditions for this extrusion step were described above in the discussion of the stable radical.

In the second extrusion step the grafting of the free-radical polymerisable monomer (D) to the olefin polymer (A) is conducted. The temperature of the melt in the extruder is typically higher than the melting temperature of the olefin polymer (A). Preferably it is also greater than the decomposition temperature of the free-radical generator (C) if the free-radical generator (C) is used. On the other hand, the extrusion temperature is preferably lower than the decomposition temperature of the stable radical (B) and/or the decomposition temperature of the olefin polymer (A). Typically the temperature in the extruder, such as the barrel temperature, is not less than 120° C., preferably not less than 125° C. and more preferably not less than 130° C. Further, the temperature is typically not greater than 250° C., preferably not greater than 220° C. and more preferably not greater than 210° C. The design of the screw needs to ensure a proper effect of mixing and homogenisation. With these limitations in mind the person skilled in the art can find the suitable extrusion conditions. The extrusion steps described above may be conducted in any extruder known in the art. The extruder may be a single screw extruder or a twin screw extruder. Twin screw extruders are produced, among others, Coperion, Japan Steel Works, Kobe Steel and Farrel. Single screw extruders are produced, among others, by Brabender, Krauss Maffei, Collin, Cincinnati Milacron and Reifenhäuser.

As it was discussed above the stable radical (B), such as TEMPO, can be introduced directly into the feed port of the extruder. In such a case only one extrusion step is needed.

Modified Olefin Polymer (X)

The modified olefin polymer (X) contains the units derived from the free-radical polymerisable monomer (D)

grafted on the backbone of olefin polymer (A). The modified olefin polymer (X) can be used in a number of applications, for instance, as an adhesive resin in film making, extrusion coating or steel pipe coating and as a compatibiliser in blends. A special advantage of the process of the present invention is that the properties related to the molecular weight of the original olefin polymer (A), such as the melt index, remain unaffected during the grafting process. The absence of cross-linking or long-chain branch formation results in a good homogeneity of the final articles and good adhesion properties when using the modified olefin polymer (X). In addition the modified olefin polymer (X) can easily be mixed with other polymers, such as other olefin polymers.

EXAMPLES

Description of methods
Melt Flow Rate

Melt flow rate (MFR) was determined according to ISO 1133 at 190° C. The load under which the measurement is conducted is given as a subscript. Thus, the MFR under the load of 2.16 kg is denoted as $MFR_2$. The melt flow rate $MFR_{21}$ is correspondingly determined at 190° C. under a load of 21.6 kg.

Density

Density of the polymer was measured according to ISO 1183-1:2004 Method A on compression moulded specimen prepared according to EN ISO 1872-2 (February 2007) and is given in $kg/m^3$.

Unsaturation Content

Quantitative nuclear-magnetic resonance (NMR) spectroscopy was used to quantify the content of unsaturated groups present in the polymers.

Quantitative $^1H$ NMR spectra recorded in the solution-state using a Bruker Advance III 400 NMR spectrometer operating at 400.15 MHz. All spectra were recorded using a $^{13}C$ optimised 10 mm selective excitation probehead at 125° C. using nitrogen gas for all pneumatics. Approximately 200 mg of material was dissolved in 1,2-tetrachloroethane-$d_2$ (TCE-$d_2$) using approximately 3 mg of Hostanox 03 (CAS 32509-66-3) as stabiliser. Standard single-pulse excitation was employed utilising a 30 degree pulse, a relaxation delay of 10 s and 10 Hz sample rotation. A total of 128 transients were acquired per spectra using 4 dummy scans. This setup was chosen primarily for the high resolution needed for unsaturation quantification and stability of the vinylidine groups. {he10a, busico05a} All chemical shifts were indirectly referenced to TMS at 0.00 ppm using the signal resulting from the residual protonated solvent at 5.95 ppm.

Characteristic signals corresponding to the presence of terminal or pendant aliphatic vinyl groups (R—CH=$CH_2$) were observed and the amount quantified using the integral of the two coupled inequivalent terminal $CH_2$ protons (Va and Vb) at 4.95, 4.98 and 5.00 and 5.05 ppm accounting for the number of reporting sites per functional group:

$$Nvinyl=IVab/2$$

Characteristic signals corresponding to the presence of internal vinylidine groups (RR'C=$CH_2$) were observed and the amount of quantified using the integral of the two $CH_2$ protons (D) at 4.74 ppm accounting for the number of reporting sites per functional group:

$$Nvinylidine=ID/2$$

Characteristic signals corresponding to the presence of internal cis-vinyline groups (E-RCH=CHR'), or related structure, were observed and the amount quantified using the integral of the two CH protons (C) at 5.39 ppm accounting for the number of reporting sites per functional group:

$$Ncis=IC/2$$

Characteristic signals corresponding to the presence of internal trans-vinyline groups (Z—RCH=CHR') were observed and the amount quantified using the integral of the two CH protons (T) at 5.45 ppm accounting for the number of reporting sites per functional group:

$$Ntrans=IT/2$$

The Hostanox 03 stabiliser was quantified using the integral of multiplet from the aromatic protons (A) at 6.92, 6.91, 6.69 and at 6.89 ppm and accounting for the number of reporting sites per molecule:

$$H=IA/4$$

As is typical for unsaturation quantification in polyolefins the amount of unsaturation was determined with respect to total carbon atoms, even though quantified by $^1H$ NMR spectroscopy. This allows direct comparison to other microstructure quantities derived directly from $^{13}C$ NMR spectroscopy. The total amount of carbon atoms was calculated from integral of the bulk aliphatic signal between 2.85 and −1.00 ppm with compensation for the methyl signals from the stabiliser and carbon atoms relating to unsaturated functionality not included by this region:

$$NCtotal=(Ibulk-42*H)/2+2*Nvinyl+2*Nvinylidine+2*Ncis+2*Ntrans$$

The content of unsaturated groups (U) was calculated as the number of unsaturated groups in the polymer per thousand total carbons (kCHn):

$$U=1000*N/NCtotal$$

The total amount of unsaturated group was calculated as the sum of the individual observed unsaturated groups and thus also reported with respect per thousand total carbons:

$$Utotal=Uvinyl+Uvinylidine+Ucis+Utrans$$

REFERENCES

He, Y., Qiu, X, and Zhou, Z., Mag. Res. Chem. 2010, 48, 537-542.
Busico, V. et. al. Macromolecules, 2005, 38 (16), 6988-6996

Compounding with Coperion ZSK18 MEGAlab

The Preparation Examples 1 to 5 were conducted in ZSK18 co-rotating twin screw kneader, manufactured by Coperion, having a screw diameter of 18 mm and a ratio of the length to the diameter of the screw (L/D) of 40. The maximum temperature in the extruder was 185° C. The screw speed was 300 rpm, the throughput 3 kg/h and the specific energy input varied between 0.383 and 0.425 kWh/kg. The temperature profile in the extruder, i.e., the barrel temperatures, was 20/185/160/120/120/120/120/140° C.

Maleic Anhydride (MAH) Unit Content in the Polymer

The MAH quantification in a MAH-containing polyethylene material is determined by Fourier Transform Infrared Spectroscopy (FT-IR) analysis. A compression-moulding sample preparation process is needed before the FT-IR measurement. The MAH-containing polyethylene sample (approximately 300 mg) is homogenised and then pressed at 190° C. and under 60 bar to form a 300 μm thickness film. The film is then scanned in a FT-IR Bruker—Vertex 70 spectrometer using transmission-mode at the mid infrared region between 4000 cm$^{-1}$ and 400 cm$^{-1}$ under the following scan—configuration: 16 scans, resolution 2 cm$^{-1}$ and strong apodisation.

The area of the peak in the region of 1785 cm$^{-1}$ standing for MAH (grafted and non-grafted) is measured baseline-corrected and the MAH—content was calculated with the formula resulting of a calibration—curve including 4 standards containing between 0.0 wt. % and 1.4 wt % of MAH.

Area 1785 cm$^{-1}$/thickness of the film (in cm)×calibration–factor=wt % MAH

Polymers

Two ethylene copolymers, Resin A and Resin B were used in the examples below. Resin A is produced by copolymerising ethylene and 1-octene in the presence of a metallocene catalyst in solution polymerisation process. Resin B is produced by homopolymerising ethylene in solution polymerisation process in the presence of a Ziegler-Natta catalyst. The data of Resins A and B is shown in Table 1 below.

TABLE 1

Data of ethylene copolymer resins

| Resin | A | B |
|---|---|---|
| Comonomer | 1-octene | No |
| Comonomer content, wt-% | 12 | 0 |
| MFR$_2$, g/10 min | 1.1 | 10 |
| Density, kg/m$^3$ | 910 | 963 |
| Total amount of unsaturated groups, #/1000 C | 0.46 | 0.43 |
| Vinylidene (R$_1$R$_2$C=CH$_2$), #/1000 C | 0.11 | 0.0 |
| Vinyl (RC=CH2), #/11000 C | 0.06 | 0.43 |
| Tris (RCH=CR$_1$R$_2$), #/1000 C | 0.15 | 0.0 |
| Vinylene (R$_1$CH=CHR$_2$), #/1000 C | 0.14 | 0.0 |

Preparation Example 1 (Comparative)

99.8 parts per weight of Resin A as described above was mixed with 0.20 parts per weight of Trigonox BPIC-C75 (tert-butylperoxy isobutyl carbonate) sold by AkzoNobel. The mixture was fed into the feed hopper of ZSK18 and extruded to pellets as was described above. The resulting pellets had MFR$_2$ of 0.10 g/10 min. The ratio of the peroxy group to the weight of polymer was 0.011 mol/kg.

Preparation Example 2 (PE2)

99.29 parts per weight of Resin A was mixed with 0.71 parts per weight of 2,2,4,4-tetramethylpiperidinyloxy (TEMPO). The mixture was fed into the feed hopper of ZSK18 and extruded to pellets as described above. The resulting pellets had MFR$_2$ of 1.3 g/10 min. The resin is referred to as PE2 in the subsequent text. The ratio of the nitroxy groups to the weight of polymer was 0.046 mol/kg.

Preparation Example 3 (Comparative)

99.09 parts per weight of Resin A was mixed with 0.20 parts per weight of Trigonox BPIC-C75 (tert-butylperoxy isobutyl carbonate) sold by AkzoNobel. The mixture was fed into the feed hopper of ZSK18. Into the extruder was introduced 0.71 parts per weight of 2,2,4,4-tetramethylpiperidinyloxy through the side feeder of the extruder located about 200 mm downstream of the feed hopper. The mixture was extruded to pellets as described above. The resulting pellets had MFR$_2$ of 0.10 g/10 min. The ratio of the nitroxy groups to the weight of polymer was 0.046 mol/kg and the ratio of the peroxy group to the weight of polymer was 0.011 mol/kg.

Preparation Example 4 (Comparative)

The procedure of Preparation Example 3 was repeated except that the amount of Resin A was 99.45 parts per weight, the amount of Trigonox BPIC-C75 was 0.20 parts per weight and the amount of 2,2,4,4-tetramethylpiperidinyloxy was 0.35 parts per weight. The resulting pellets had MFR$_2$ of 0.09 g/10 min. The ratio of the nitroxy groups to the weight of polymer was 0.023 mol/kg and the ratio of the peroxy group to the weight of polymer was 0.011 mol/kg.

Preparation Example 5

The procedure of Preparation Example 4 was repeated except that all the ingredients were added to the feed hopper of the extruder and the side feeder was not used. The resulting pellets had MFR$_2$ of 1.0 g/10 min. The resin is referred to as PE5 in the subsequent text. The ratio of the nitroxy groups to the weight of polymer was 0.023 mol/kg and the ratio of the peroxy group to the weight of polymer was 0.011 mol/kg.

Preparation Example 5 shows the effect of sufficient contact time of TEMPO with the other ingredients. In Preparation Example 5 TEMPO was added to the main feed hopper and thus the contact between TEMPO was present throughout the whole process whereas in the Preparation Examples 3 and 4 TEMPO was added through the side feeder and was thus not effective in the whole process. This shows the negative effect of contacting the peroxide with the polymer in the absence of TEMPO.

TABLE 2

Summary data of Preparation Examples 1-5:

| Preparation Example | 1 (C) | 2 | 3 (C) | 4 (C) | 5 |
|---|---|---|---|---|---|
| Resin A, ppw | 99.8 | 99.29 | 99.09 | 99.45 | 99.45 |
| Trigonox BPIC-C75, ppw | 0.20 | 0 | 0.20 | 0.20 | 0.20 |
| TEMPO, ppw | 0 | 0.71 | 0.71 | 0.35 | 0.35 |
| MFR$_2$, g/10 min | 0.10 | 1.3 | 0.10 | 0.09 | 1.0 |

Example 1

Into the Coperion ZSK18 extruder described above were introduced 95.54 parts per weight of the pellets produced according to Preparation Example 2 (PE2) and 4.46 parts per weight of maleic acid anhydride. The temperature in the extruder was as disclosed above for the compounding conditions for the ZSK18 MEGAlab. The MFR$_2$ of the graft copolymer was 1.2 g/10 min. The ratio of the maleic acid anhydride to the weight of polymer was 0.48 mol/kg.

Example 2

The procedure of Example 1 was repeated except that the material of Preparation Example 5 (PE5) was used instead of the material of Preparation Example 2 (PE2) and the amount of PE5 was 98.68 parts per weight and the amount of maleic acid anhydride was 1.32 parts per weight. The MFR$_2$ of the graft copolymer was 1.1 g/10 min. The ratio of the maleic acid anhydride to the weight of polymer was 0.14 mol/kg.

Example 3

The procedure of Example 2 was repeated except that the amount of the material of Preparation Example 5 (PE5) was 97.8 parts per weight and the amount of maleic acid anhydride was 2.2 parts per weight. The $MFR_2$ of the resulting graft copolymer was 1.1 g/10 min. The ratio of the maleic acid anhydride to the weight of polymer was 0.23 mol/kg.

Example 4 (Comparative)

Into the feed port of the Coperion ZSK18 extruder described above were introduced 95.34 parts per weight of Resin A, 0.20 parts per weight of BPIC-C75 and 4.46 parts per weight of maleic acid anhydride. The temperature in the extruder was as disclosed above for the compounding conditions for the ZSK18 MEGAlab. The $MFR_2$ of the graft copolymer was 0.2 g/10 min. The ratio of the maleic acid anhydride to the weight of polymer was 0.48 mol/kg and the ratio of the peroxy group to the weight of polymer was 0.012 mol/kg.

TABLE 3

Summary data of Examples 1-4:

| Example | 1 | 2 | 3 | 4 (C) |
|---|---|---|---|---|
| PE2 | 95.54 | — | — | — |
| PE5 | — | 98.68 | 97.8 | — |
| Resin A | — | — | — | 95.34 |
| Maleic Anhydride | 4.46 | 1.32 | 2.2 | 4.46 |
| BPIC-C75 | — | — | — | 0.20 |
| $MFR_2$, g/10 min | 1.2 | 1.1 | 1.1 | 0.20 |

Example 5

The procedure of Example 4 was repeated except that Block Builder RC50 was introduced into the feed port of the extruder and the amount of Resin A was 88.94 parts per weight, the amount of BPIC-C75 was 0.20 parts per weight, the amount of RC-50 was 6.40 parts per weight and the amount of maleic acid anhydride was 4.46 parts per weight. The ratio of the maleic acid anhydride to the weight of polymer was 0.51 mol/kg, the ratio of the nitroxy groups to the weight of polymer was 0.24 mol/kg and the ratio of the peroxy groups to the weight of polymer was 0.013 mol/kg.

TABLE 4

Summary data of Example 5 in comparison with Example 4 (Comparative):

| Example | 5 | 4 (C) |
|---|---|---|
| Resin A | 88.94 | 95.34 |
| Maleic Anhydride | 4.46 | 4.46 |
| BPIC-C75 | 0.20 | 0.20 |
| Block builder RC-50 | 6.40 | — |
| $MFR_2$, g/10 min | 1.0 | 0.2 |

Example 6 (Comparative)

The procedure of Example 4 was repeated but Resin B was used instead of Resin A. The ratio of the maleic acid anhydride to the weight of polymer was 0.48 mol/kg and the ratio of the peroxy groups to the weight of polymer was 0.012 mol/kg.

Example 7

The procedure of Example 5 was repeated but Resin B was used instead of Resin A. The ratio of the maleic acid anhydride to the weight of polymer was 0.51 mol/kg, the ratio of the nitroxy groups to the weight of polymer was 0.24 mol/kg and the ratio of the peroxy groups to the weight of polymer was 0.013 mol/kg.

TABLE 5

Summary data of Example 7 in comparison with Example 6 (Comparative):

| Example | 7 | 6 (C) |
|---|---|---|
| Resin B | 88.94 | 95.34 |
| Maleic Anhydride | 4.46 | 4.46 |
| BPIC-C75 | 0.20 | 0.20 |
| Block builder RC-50 | 6.40 | — |
| $MFR_2$, g/10 min | 5.8 | 0.5 |

Example 8

The resins of Examples 1, 2 and 3 were purified as follows.

Purification Process

Around 9 g of polyethylene material (raw material) were distributed in metal nets. Then they were introduced in a 2000 ml flask containing 1000 ml of o-xylene and heated at 140° C. during 5 hours. After 5 hours, the nets were introduced again in a 2000 ml flask containing 1000 ml of fresh o-xylene and heated at 140° C. during 1 hour. Then the solid fraction (nets containing some material) were dried overnight in a vacuum oven at 90° C. and then weighted. The resulting 2000 ml liquid (o-xylene) obtained from the 2 extraction process were then cooled down to 25° C. and poured in 3000 ml of acetone in order to precipitate the material dissolved in the o-xylene. The solid precipitated material was then filtered, washed 3 times with 25 ml of acetone and dried overnight in a vacuum oven at 90° C.

For the resins of Examples 1, 2 and 3 the amount of maleic acid anhydride grafted to the polymer backbone was analysed from the acetone insoluble fraction.

TABLE 6

The content of MAH units in the acetone insoluble fraction of Examples 1-3:

| Resin of Example | 1 | 2 | 3 |
|---|---|---|---|
| MAH content | 0.069% | 0.006% | 0.016% |

The invention claimed is:

1. A process of producing a modified olefin polymer (X) comprising a free-radical polymerisable monomer grafted to a polyolefin backbone in an extruder, which process comprises: contacting, in an extruder, an olefin polymer (A) and the free-radical polymeriseable monomer (D) and optionally a free-radical generator (C) to produce a mixture; extruding the mixture in the extruder in the presence of a stable nitroxide radical (B) that is formed by decomposition of an alkoxyamine (F) added to the extruder together with the olefin polymer (A) and, when included, the free-radical generator (C), thereby graft copolymerising the free-radical polymerisable monomer (D) to the olefin polymer (A) to produce the modified polymer composition (X); recovering the modified olefin polymer (X) from the extruder; and cooling the modified olefin polymer (X);
wherein the free-radical polymerisable monomer (D) is an unsaturated hydrolysable silane compound or a mixture of unsaturated hydrolysable silane compounds;
and wherein the alkoxyamine (F) has the formula

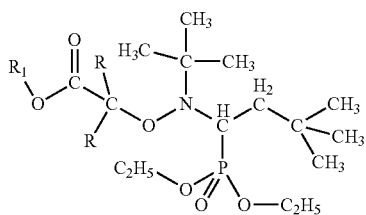

wherein each R is independently a linear or branched alkyl group having from 1 to 3 carbon atoms and $R_1$ is one of a hydrogen atom, an alkali metal, $NH_4^+$, $Bu_4N^+$ or $Bu_3NH^+$, where Bu denotes a butyl group.

2. The process according to claim 1 wherein the free-radical generator (C) is not used.

3. The process according to claim 1 wherein the ratio of the nitroxy groups in the stable radical (B) to the weight of the olefin polymer (A) is from 0.005 to 1.0 mol/kg.

4. The process according to claim 3 wherein the ratio of the nitroxy groups in the stable radical (B) to the weight of the olefin polymer (A) is from 0.01 to 0.8 mol/kg.

5. The process according to claim 1 comprising the step of contacting the free-radical generator (C) with the olefin polymer (A) in the extruder.

6. The process according to claim 5 wherein the temperature in the extruder is greater than the decomposition temperature of the free radical generator (C) but less than the decomposition temperature of the stable radical (B).

7. The process according to claim 1 wherein the olefin polymer (A) is an ethylene polymer which is a homo- or copolymer of ethylene.

8. The process according to claim 7 wherein the polyolefin polymer is an ethylene polymer that has a melt index $MFR_2$ of from 0.3 to 100 g/10 min.

9. The process according to claim 1 wherein the free-radical polymerisable monomer (D) is selected from the group consisting of vinyltrimethoxysilane, vinyltriethoxysilane, diphenylvinylethoxysilane, diphenylvinylchlorosilane, 5-hexenyltriethoxysilane, 5-hexenyldimethylchlorosilane, 3-methacryloxypropyldimethoxysilane, 7-octenyltrimethoxysilane, styrylethyldiethoxysilane, vinyltris-(β-methoxyethoxy)silane, 3-methacryloxypropyl trimethoxysilane, and mixtures thereof.

10. The process according to claim 1 wherein the stable nitroxide radical (B) is formed by a cleavage of the alkoxyamine (F).

11. The process according to claim 10 wherein the free-radical polymerisable monomer (D) is selected from the group consisting of vinyltrimethoxysilane, vinyltriethoxysilane, diphenylvinylethoxysilane, diphenylvinylchlorosilane, 5-hexenyltriethoxysilane, 5-hexenyldimethylchlorosilane, 3-methacryloxypropyldimethoxysilane, 7-octenyltrimethoxysilane, styrylethyldiethoxysilane, vinyltris(β-methoxyethoxy)silane, 3-methacryloxypropyl trimethoxysilane, and mixtures thereof.

12. The process according to claim 10 wherein the polyolefin polymer is an ethylene polymer that has a melt index $MFR_2$ of from 0.3 to 100 g/10 min.

* * * * *